(12) United States Patent
Yamamoto et al.

(10) Patent No.: US 7,124,002 B2
(45) Date of Patent: Oct. 17, 2006

(54) TIRE AIR PRESSURE ABNORMALITY WARNING DEVICE AND METHOD

(75) Inventors: Kouichi Yamamoto, Miyagi-ken (JP); Tomosuke Takata, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/659,875

(22) Filed: Sep. 9, 2003

(65) Prior Publication Data

US 2004/0049329 A1 Mar. 11, 2004

(30) Foreign Application Priority Data

Sep. 11, 2002 (JP) .............................. 2002-265514

(51) Int. Cl.
*B60C 23/00* (2006.01)
*G08C 19/00* (2006.01)

(52) U.S. Cl. .......................... 701/29; 73/146; 340/442

(58) Field of Classification Search ................... 701/2, 701/29; 73/146.2, 146; 340/442; 307/10.1, 307/10.3
See application file for complete search history.

(56) References Cited

U.S. PATENT DOCUMENTS

| | | | |
|---|---|---|---|
| 5,081,443 A | | 1/1992 | Breit |
| 5,463,374 A | * | 10/1995 | Mendez et al. .............. 340/442 |
| 5,500,637 A | * | 3/1996 | Kokubu ....................... 340/447 |
| 6,043,738 A | * | 3/2000 | Stewart et al. .............. 340/447 |
| 6,243,007 B1 | * | 6/2001 | McLaughlin et al. ........ 340/447 |
| 6,259,362 B1 | * | 7/2001 | Lin ............................. 340/457 |
| 6,438,467 B1 | * | 8/2002 | Pacsai ............................ 701/2 |
| 6,505,507 B1 | * | 1/2003 | Imao et al. ................. 73/146.5 |
| 6,647,773 B1 | * | 11/2003 | Nantz et al. ............... 73/146.5 |
| 2001/0050611 A1 | | 12/2001 | Achterholt |

FOREIGN PATENT DOCUMENTS

| | | |
|---|---|---|
| DE | 101 64 333 A | 9/2002 |
| EP | 0 995 619 A | 4/2000 |

* cited by examiner

*Primary Examiner*—Dalena Tran
(74) *Attorney, Agent, or Firm*—Brinks Hofer Gilson & Lione

(57) ABSTRACT

A tire air pressure abnormality warning device includes a transmitter for transmitting a signal of the air pressure of a tire measured by a pressure sensor, a portable device for opening and closing a door lock of a vehicle, and a vehicle-installed device for determining whether or not the signal from the transmitter indicates an abnormal air pressure of the tire and for driving the door lock by a signal from the portable device. The vehicle-installed device has a recording section for recording tire air pressure abnormality data. When the vehicle-installed device communicates with the portable device, it searches for any abnormality data from the recording section. If there is any abnormality data, it transmits a tire air pressure abnormality signal to the portable device. The portable device indicates a warning of abnormal air pressure of the tire by the tire air pressure abnormality signal using a warning indicating section.

7 Claims, 4 Drawing Sheets

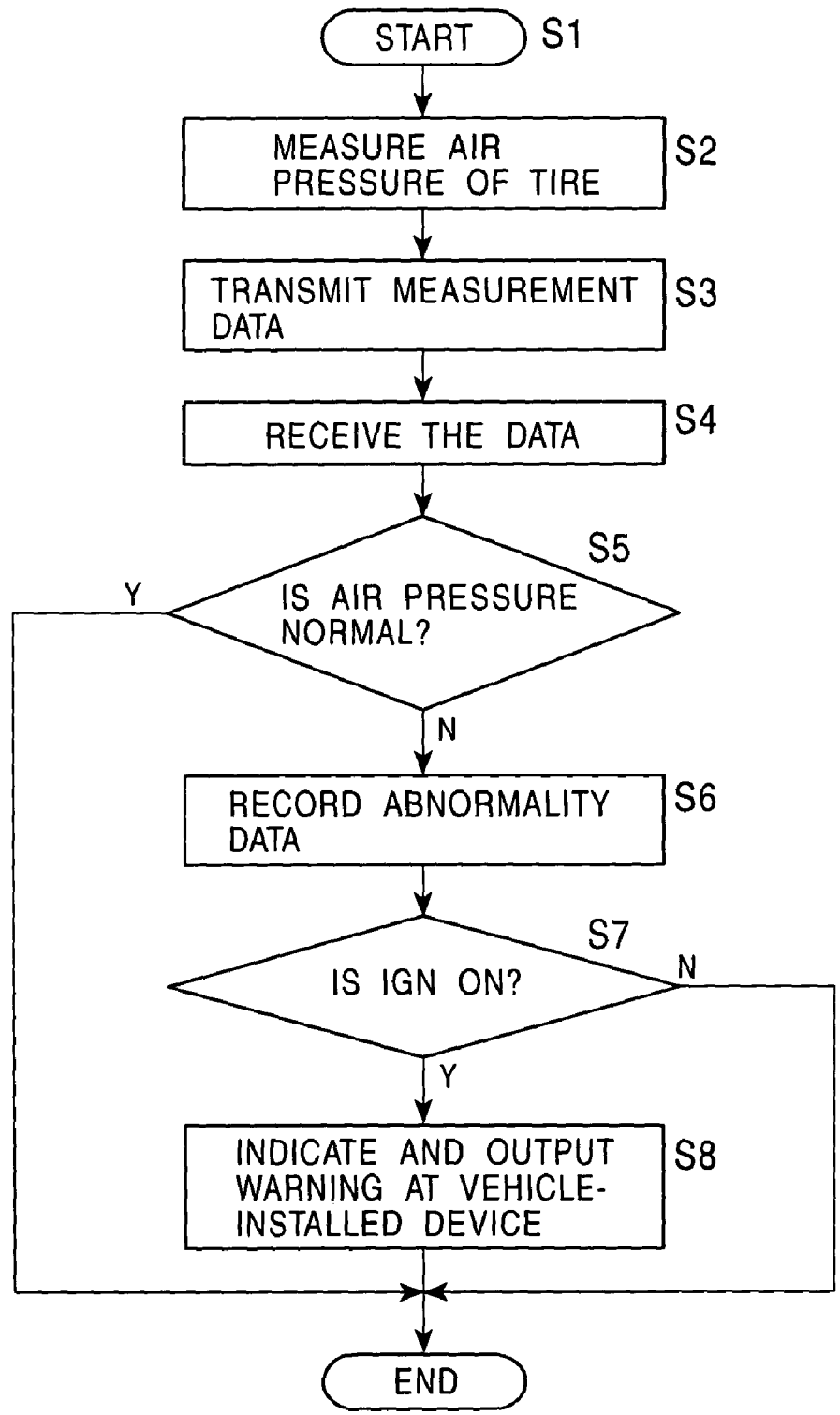

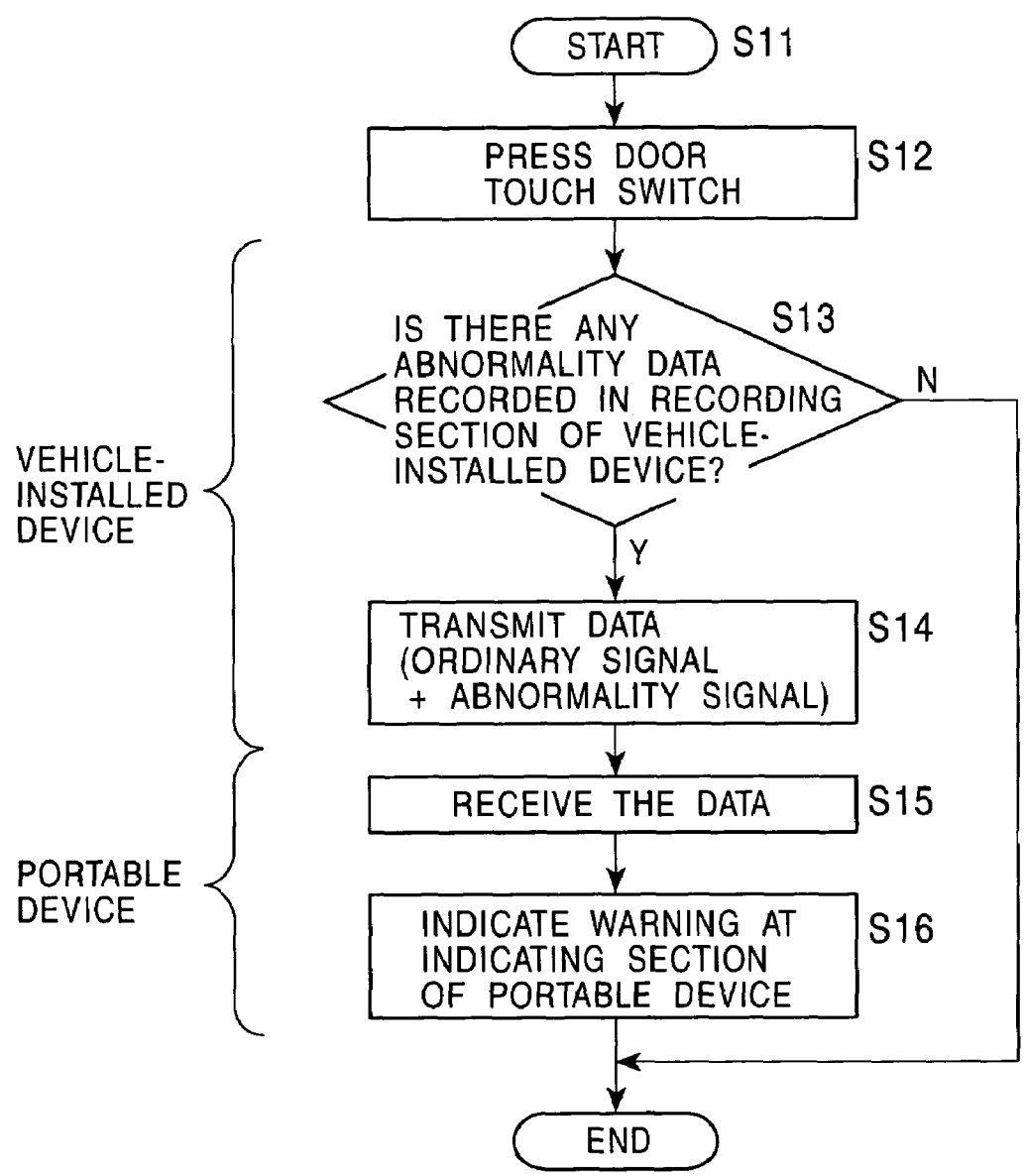

TIRE AIR PRESSURE ABNORMALITY WARNING DEVICE AND METHOD

This application claims the benefit of priority to Japanese Patent Application No. 2002-265514, filed on Sep. 11, 2002.

BACKGROUND OF THE INVENTION

1. Field of the Invention

The present invention relates to a tire air pressure monitoring system (TPMS) comprising a vehicle-installed device, a portable keyless entry device, and a tire air pressure transmitter, and, more particularly, to a technology for giving a warning when an abnormality in the air pressure of a tire occurs.

2. Description of the Related Art

According to a related technology, a tire air pressure abnormality warning device comprises air pressure sensors for detecting the internal air pressures of tires. Detection signals from the sensors are output from transmitters mounted to wheels, and a receiver in an automobile receives the output detection signals. When an abnormal air pressure of any tire is detected, a warning is given by a driver's indicator panel.

Japanese Patent No. 2716335 discloses a structure in which a receiver, which receives a door lock signal and a door unlock signal from a radio-wave key (operating key), in a vehicle receives an abnormality detection signal from a transmitter that indicates an abnormal state of a tire. It also discloses a technology in which, based on the tire abnormality detection signal, a first warning unit or a second warning unit is selectively driven in order to output a warning inside or outside the vehicle. In other words, by selectively giving a warning inside or outside the vehicle when an abnormality of a tire is detected, the warning is given in accordance with whether a person is in the vehicle or is not in a parked vehicle.

The related technology for giving a warning by a driver's indicator panel causes inconvenience to a driver because, after a warning has been given by the indicator panel, the driver must get out of the vehicle in order to check the actual air pressure of a tire. In particular, when an abnormality in the air pressure of a tire of a parked vehicle is detected, a person cannot confirm any warning unless the person gets into the vehicle and looks at or listens to the driver's indicator panel. Therefore, after confirming the warning, the person must get off the vehicle again and actually check the abnormality of the tire, thereby causing inconvenience to the person.

In addition, in the technology that is disclosed in the aforementioned document, although, when the driver is outside the vehicle, he can know that a tire abnormality has occurred by a warning that is directed to the outside of the vehicle, the driver cannot know that the abnormality has occurred when he is outside a range that allows him to hear the warning.

SUMMARY OF THE INVENTION

Accordingly, it is an object of the present invention to make it possible to efficiently warn a driver of an abnormal air pressure of a tire and make it possible for the driver to efficiently confirm any tire abnormality in accordance with whether the driver gets into or out of a vehicle by warning the driver of the abnormal tire air pressure when the driver gets into or out of the vehicle.

To this end, according to a first aspect of the present invention, there is provided a tire air pressure abnormality warning device comprising a transmitter for transmitting a signal that corresponds to air pressure of a tire measured by a pressure sensor; a portable keyless entry device for opening and closing a door lock of a vehicle; and a vehicle-installed device for determining whether or not the air pressure of the tire is abnormal by receiving the signal from the transmitter in order to output data regarding the determination, the vehicle-installed device driving the door lock by communication with the portable device. The vehicle-installed device comprises a recording section for recording data of any abnormality in the air pressure of the tire. The portable device comprises a warning indicating section for indicating that the air pressure of the tire is abnormal. The vehicle-installed device searches for any abnormality data from the recording section when the vehicle-installed device communicates with the portable device, so that, when there is abnormality data, a tire air pressure abnormality signal is transmitted to the portable device. The portable device indicates a warning of an abnormal air pressure of the tire by the tire air pressure abnormality signal that the portable device has received.

By virtue of this structure, in the tire air pressure abnormality warning device of the present invention, abnormal tire air pressures are stored in a storage section. During keyless entry communication between the portable device and the vehicle-installed device, the vehicle-installed device reads out any abnormal tire air pressure and transmits a tire air pressure abnormality signal to the portable device. The portable device receives the tire air pressure abnormality signal and, by using the signal, indicates an abnormality in the air pressure of a tire at the warning indicating section. According to the present invention, by disposing the warning indicating section at the portable keyless entry device, it is possible to indicate a warning of an abnormality in the air pressure of a tire at the portable device. In addition, since, during key entry communication, an abnormal tire air pressure is automatically checked and a warning is indicated by the portable device, a driver carrying the portable device can know that an abnormality in the air pressure of a tire has occurred before getting into the vehicle, so that the driver can immediately confirm the abnormality of the tire.

When the structure of the first aspect of the present invention is used, in a first form, the communication between the vehicle-installed device and the portable device is a passive keyless entry communication using a request signal from the vehicle-installed device and an answer signal from the portable device, and the tire air pressure abnormality signal is transmitted along with the request signal.

By virtue of this structure, in the tire air pressure abnormality warning device of the present invention, when a passive keyless entry communication is carried out between the portable device carried by the driver and the vehicle-installed device, a tire air pressure abnormality signal, as well as a request signal, is transmitted to the portable device from the vehicle-installed device. According to the present invention, the driver can confirm the vehicle's door locking/unlocking controlling operation and any abnormal tire air pressure without particularly being conscious of confirming them.

When the structure of the first form is used, in a second form, a door of the vehicle comprises a door touch switch, and the request signal and the tire air pressure abnormality signal are transmitted by operating the door touch switch.

By virtue of this structure, in the tire air pressure abnormality warning device of the present invention, it is possible to restrict power consumption without emitting a request signal or a tire gas pressure signal at all times.

When the structure of the first aspect or the first form is used, in a third form, the transmitter periodically measures the air pressure of the tire and transmits the measured value to the vehicle-installed device, and, when the vehicle-installed device determines that the air pressure of the tire is abnormal, the vehicle-installed device records abnormality data in the recording section, with a driver taking out the data from the recording section at a timing in which the driver gets into or out of the vehicle.

By virtue of this structure, in the tire air pressure abnormality warning device of the present invention, since abnormal tire air pressures are previously stored in the storage section, the driver can know that an abnormality in the air pressure of a tire has occurred in a very short time at a timing in which the driver gets into and out of the vehicle.

According to a second aspect of the present invention, there is provided a method for performing a tire air pressure abnormality warning operation using a transmitter for transmitting a signal that corresponds to air pressure of a tire measured by a pressure sensor, a portable keyless entry device for opening and closing a door lock of a vehicle, and a vehicle-installed device for determining whether or not the air pressure of the tire is abnormal by receiving the signal from the transmitter in order to output data regarding the determination, the vehicle-installed device driving the door lock by communication with the portable device. The method comprises the steps of:

by the vehicle-installed device, determining that the signal transmitted from the transmitter indicates an abnormality in the air pressure of the tire and recording abnormality data in a recording section;

during communication of the vehicle-installed device with the portable device, by the vehicle-installed device, searching for any abnormality data from the recording section and, if there is any abnormality data, transmitting a tire air pressure abnormality signal to the portable device; and by the portable device, indicating a warning of abnormal air pressure of the tire by the tire air pressure abnormality signal using a warning indicating section.

By virtue of this structure, in the tire air pressure abnormality warning method of the present invention, abnormal tire air pressures are stored in a storage section. For keyless entry communication between the portable device and the vehicle-installed device, the vehicle-installed device searches for any abnormal tire air pressure and transmits a tire air pressure abnormality signal to the portable device. The portable device receives the tire air pressure abnormality signal to cause the warning indicating section to indicate that an abnormality in the air pressure of a tire has occurred. According to the present invention, it is possible to indicate a warning at the portable device that an abnormality in the air pressure of a tire has occurred. In addition, since, during key entry communication, any abnormal tire air pressure is automatically checked and a warning is indicated at the portable device, a driver carrying the portable device can know that the air pressure of a tire is abnormal before getting into the vehicle, so that the driver can immediately confirm the tire abnormality.

BRIEF DESCRIPTION OF THE DRAWINGS

FIG. 5 is a flow chart illustrating signal transmission and reception between the vehicle-installed device and the transmitter; and FIG. 6 is a flow chart illustrating signal transmission and reception between the vehicle-installed device and the portable device.

DESCRIPTION OF THE PREFERRED EMBODIMENTS

Figure 1:
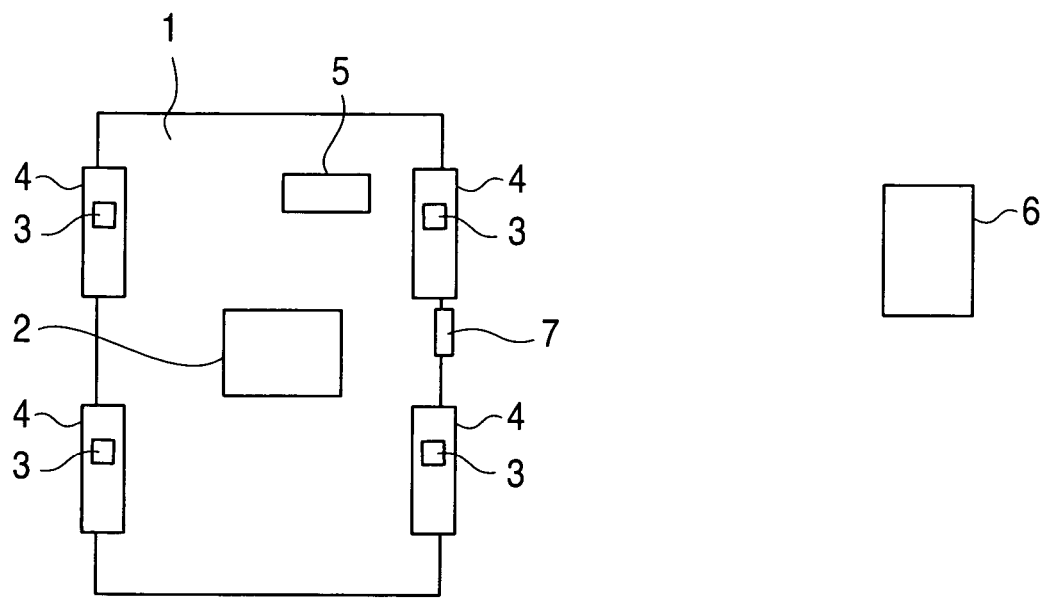
FIG. 1 shows the overall structure of a tire air pressure abnormality warning device of an embodiment of the present invention.
Figure 2:
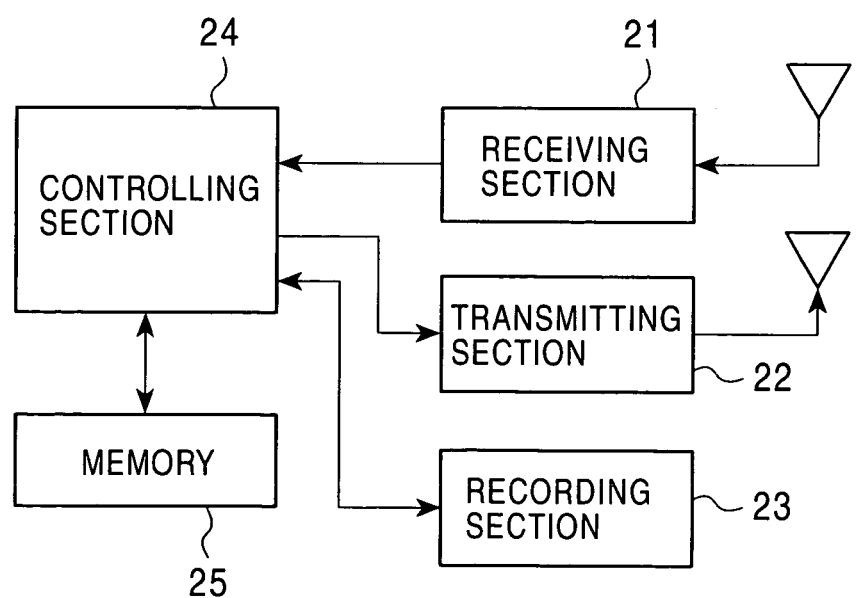
FIG. 2 is a block diagram of the structure of a vehicle-installed device used in the embodiment of the present invention.
Figure 3:
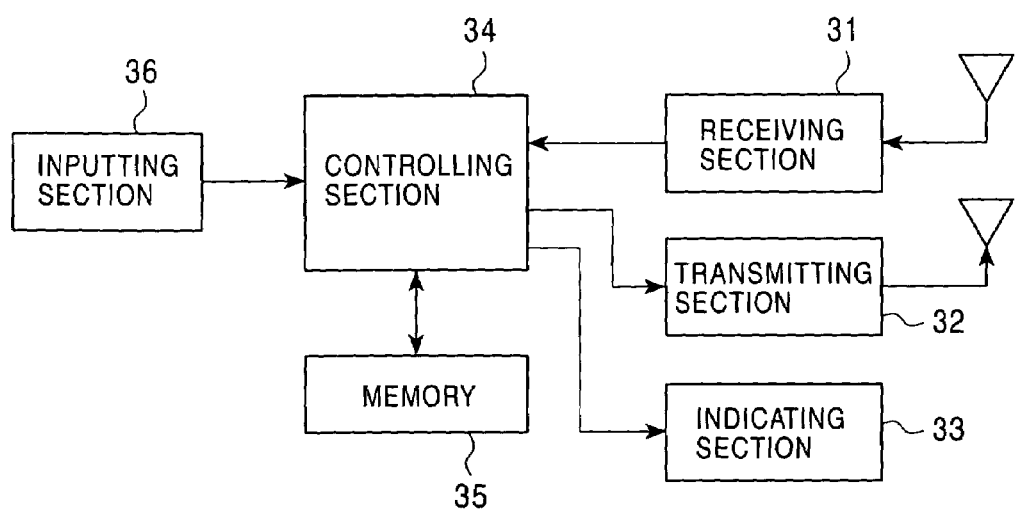
FIG. 3 is a block diagram of the structure of a portable device used in the embodiment of the present invention.
Figure 4:
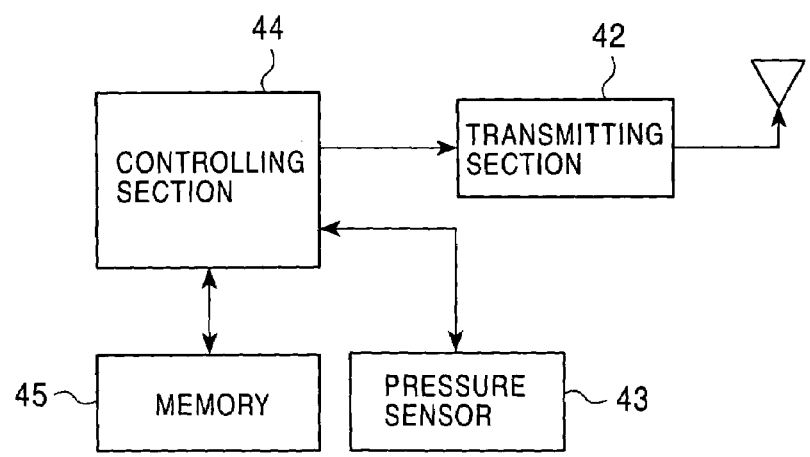
FIG. 4 is a block diagram of the structure of a transmitter used in the embodiment of the present invention.

Hereunder, a description of a tire air pressure abnormality warning device and method of embodiments of the present invention will be given with reference to the drawings. FIG. 1 shows the overall structure of a tire air pressure abnormality warning device of an embodiment of the present invention. FIG. 2 is a block diagram of the structure of a vehicle-installed device of a tire air pressure monitoring system (TPMS), which is used in the embodiment of the present invention. FIG. 3 is a block diagram of the structure of a portable device used in the embodiment of the present invention. FIG. 4 is a block diagram of the structure of a transmitter used in the embodiment of the present invention. FIG. 5 is a flow chart illustrating signal transmission and reception between the vehicle-installed device and the transmitter. FIG. 6 is a flow chart illustrating signal transmission and reception between the vehicle-installed device and the portable device.

In these figures, reference numeral 1 denotes a vehicle, reference numeral 2 denotes a vehicle-installed device, reference numerals 3 denote transmitters, reference numerals 4 denote tires, reference numeral 5 denotes a vehicle-installed indicator device, reference numeral 6 denotes a portable device, reference numeral 7 denotes a door-touch switch, reference numerals 21 and 31 denote receiving sections, reference numerals 22, 32, and 42 denote transmitting sections, reference numeral 23 denotes a recording section, reference numerals 24, 34, and 44 denote controlling sections, reference numerals 25, 35, and 45 denote memories, reference numeral 36 denotes an input section, and reference numeral 43 denotes a pressure sensor.

In FIG. 1, the transmitters 3 are mounted to the respective tires or wheels of the vehicle 1. They periodically measure the pressures and/or temperatures in the tires and modulate the measured values for transmission by radio. More specifically, as shown in FIG. 4, each transmitter 3 comprises its associated pressure sensor 43 for measuring the air pressure in its associated tire, and periodically measures the pressure by a controlling operation of its associated controlling section 44 for transmitting the measured value through its associated transmitting section 42 and antenna. Each memory 45 stores, for example, a tire ID and a program for the controlling operation of its associated controlling section 44.

The vehicle-installed device 2 is disposed at a suitable location in the vehicle 1. It transmits a radio signal to and receives a radio signal from the portable device 6, that is, it transmits a request signal and receives an answer signal. In addition, it receives pieces of tire air pressure data from the transmitters 3 in order to determine whether or not the received pieces of data indicate normal or abnormal tire air pressures by means of the controlling sections (CPU). Here, when any of the controlling sections determines that the air pressure of a tire is abnormal, this abnormal state is recorded in the recording section 23. An actuator for driving a door lock is attached to the vehicle-installed device 2 and receives electrical power from a battery for the driving.

A passive keyless entry and a manual keyless entry related to the aforementioned request signal and answer signal will be described. "Keyless entry" is carried out to lock and unlock a door of the vehicle. The TPMS is an overall system for monitoring the air pressures of the tires of the vehicle.

In general, manual keyless entry is carried out to lock and unlock a door of the vehicle by operating a lock button and an unlock button in the vicinity of the vehicle. It is a type of keyless entry in which a unidirectional manual signal, that is, a lock signal or an unlock signal is transmitted to the vehicle-installed device from the portable device along with a portable device ID.

On the other hand, passive keyless entry is another type of keyless entry in which signal transmission and reception are carried out bi-directionally between the vehicle-installed device and the portable device. A request signal including a vehicle ID is transmitted to the portable device from the vehicle-installed device, and an answer signal including the portable device ID is transmitted to the vehicle-installed device from the portable device. The IDs are compared in order to lock or unlock a door. Passive keyless entry is carried out for strict security and theft control. There are two types of passive keyless entry. In one type, a request signal is transmitted from the vehicle-installed device when a person touches or presses a door-touch switch on a door. In the other type, a request signal is intermittently transmitted from the vehicle-installed device at all times. In terms of disposing door-touch switches, the former is a type that reliably gives concrete form to any intention of the driver to get into the vehicle. In the former, when the request signal is transmitted, the driver carrying the portable device is beside the vehicle, so that the portable device immediately receives the request signal and transmits an answer signal. In the latter, the driver carrying the portable device receives the request signal for the first time when the driver approaches the vehicle and comes within a range in which the request signal can be received, and, then, transmits an answer signal.

In the vehicle, it is also possible to carry out a type of keyless entry that is a combination of the manual keyless entry and the passive keyless entry. In this type of keyless entry, a lock button and an unlock button are provided in a passive portable keyless entry device.

Accordingly, a passive keyless entry operation basically does not use a portable device that is provided with a lock and an unlock button. Here, a relatively weak radio signal is transmitted and received, so that a locking or an unlocking operation is carried out when the portable device is at or near the vehicle. On the other hand, a manual keyless entry operation basically uses a portable device that is provided with a lock button and an unlock button. Here, a relatively strong manual radio signal is transmitted to carry out a locking or an unlocking operation. In the keyless entry type that is a combination of the passive entry type and the manual keyless entry type, a passive portable keyless entry device having a lock button and an unlock button is used in order to make it possible to transmit a manual signal.

The portable device 6 is carried by the driver. In the case of manual keyless entry, the portable device 6 has buttons for directing the driver to lock and unlock the doors of the vehicle. The portable device 6 transmits a manual radio signal for locking or unlocking a door. In addition, in the case of passive keyless entry, it receives a request signal from the vehicle-installed device 2 and transmits an answer signal. Further, regardless of the type of keyless entry, it receives an abnormal air pressure signal from the vehicle-installed device 2 and indicates a warning. More specifically, as shown in FIG. 3, the portable device 6 comprises the receiving section 31, the transmitting section 32, the indicating section 33 for indicating a warning, an inputting section 36, including a lock and an unlock button, the controlling section 34 for controlling these parts, and the memory 35 for storing the portable device ID, a program, etc. In other words, the embodiment of the present invention is applicable to both manual keyless entry and passive keyless entry.

The vehicle-installed indicator 5 (see FIG. 1) is disposed at a meter panel in the vehicle that can be easily checked by the driver when he is driving the vehicle, and receives an abnormal air pressure signal from the vehicle-installed device 2 by radio in order to indicate a warning. It receives electrical power from a battery of the vehicle.

A plurality of the door-touch switches 7 are disposed at the knobs of the respective doors. Each switch 7 generates a trigger signal for transmitting a request signal to the portable device 6 from the vehicle-installed device 2. In other words, when the driver who is outside the vehicle approaches the vehicle and touches the door-touch switches 7, trigger signals are generated in order to transmit the request signal to the portable device 6 from the vehicle-installed device 2.

Next, a description of the operation of the tire air pressure abnormality warning device of the embodiment of the present invention will be given with reference to FIGS. 5 and 6. In the basic operational process of manual keyless entry, when an operator operates a button (a lock button or an unlock button) of the portable device, the portable device transmits a manual signal in accordance with the function of the button. When the vehicle-installed device receives the manual signal, it checks a portable device ID. If the portable device ID is OK, a door lock actuator is driven. On the other hand, in the basic operational process of passive keyless entry, when the operator touches any of the door-touch switches attached to the respective doors of the vehicle, the vehicle-installed device transmits a request signal (such as a signal including vehicle IDs according to vehicle types). When the portable device receives the request signal, checks the vehicle ID, and determines that the vehicle ID is OK, it transmits an answer signal (such as a signal including portable device IDs according to portable devices). Then, the vehicle-installed device receives the answer signal, and checks the portable device ID. If the portable device ID is OK, a door lock actuator is driven to unlock the door.

Next, a tire air pressure monitoring operation in the embodiment of the present invention will be described with reference to FIG. 5. In the transmission and reception of signals between the transmitters 3 and the vehicle-installed device 2 (more specifically, one-way transmission of signals from the transmitters), the transmitters 3 measure air pressures in Step S2, and transmit data including the measured values each time a certain period of time elapses using radio waves in Step S3. When the vehicle-mounted device 2 receives the signals in Step S4, it determines whether the signals indicate normal or abnormal air pressures in Step S5. If it determines that the air pressure of any of the tires is abnormal, it records the abnormality in the recording section in Step S6. What are recorded are, for example, data concerning the time and date of occurrence of the abnormality, which tire or tires among the mounted tires have become abnormal, whether the air pressure is too high or too low, and whether an absence of a signal is due to a dead battery or batteries of any of the tires.

When an abnormal state data is recorded in the recording section, if an ignition switch (IGN SW) is on in Step S7, that is, if the operator is in the vehicle for starting the engine of the vehicle, a warning is output at the vehicle-installed indicator 5 in Step S8, so that the driver can check the warning, thereby allowing the driver to easily realize that the air pressure of a tire is abnormal.

Next, referring to FIG. 6, in the transmission and reception of signals between the vehicle-installed device 2 and the portable device 6, when the driver who is carrying the portable device 6 presses any of the door touch switches 7 while the doors of the vehicle are locked in Step S12, the vehicle-installed device 2 examines the recording section 23 (see FIG. 2) in Step S13. If an abnormality data is not recorded, a signal including a vehicle ID and a portable device ID is transmitted as a request signal. The portable device 6 receives the signal from the vehicle-installed device 2, and compares the vehicle ID and the portable device ID. If they match, the portable device 6 transmits an answer signal. The vehicle-installed device 2 receives the answer signal, so that a door actuator is driven in order to unlock the door.

On the other hand, if, in Step S13 shown in FIG. 6, an abnormality data is recorded in the vehicle-installed device 2, the vehicle-installed device 2 transmits an abnormal air pressure signal (such as a signal indicating whether or not an abnormality in air pressure has occurred) in addition to the request signal including the vehicle ID and the portable ID in Step S14. In other words, the vehicle-installed device 2 transmits data carrying the request signal and the signal indicating whether or not an abnormality in air pressure has occurred. (In FIG. 6, what is called an ordinary signal corresponds to the request signal.) The portable device 6 receives the data signals in Step S15. If the IDs match, a warning is indicated at the warning indicating section 33 (see FIG. 3) of the portable device 6 in Step S16. The warning is indicated using characters, sound, vibration, or the like. By the warning, the driver can realize that an abnormality in the air pressure of a tire has occurred before getting into the vehicle, so that the driver can actually examine the tire before he gets into the vehicle. The driver can check the details of any abnormal tire air pressure at the vehicle-installed indicator 5.

In the foregoing description, in order to make the driver realize that an abnormality in the air pressure of any of the tires has occurred before he gets into the vehicle, when the driver carrying the portable device approaches and reaches the vehicle and operates any of the door touch switches, an abnormal air pressure signal (the signal may also be an abnormal tire signal) is also transmitted to the portable device. In addition to this, in order to make the driver realize that an abnormality in the air pressure of any of the tires has occurred when he moves away from the vehicle, when the driver gets out of the vehicle and locks the doors with the door touch switches, an abnormal air pressure signal is transmitted to the portable device.

Although in the foregoing description, the case where an abnormal air pressure signal is transmitted to the portable device by the operation of any of the door touch switches (when the driver has approached the vehicle and is ready to get into it), the present invention is not limited thereto. Alternatively, it is possible to, when a manual signal is transmitted from the portable device to lock or unlock a door, detect reception of the manual signal and to transmit an abnormal air pressure signal from the vehicle-installed device to the portable device based on the detection.

In the foregoing description a warning device having both a manual keyless entry function and a passive keyless entry function is described. In short, the present invention is applicable to keyless entry using manual signals (lock and unlock signals), a request signal, and an answer signal.

The present invention makes it possible to indicate a warning at the portable device that an abnormality in the air pressure of a tire has occurred by disposing an indicating section or an informing section in the portable device.

Since the air pressures of the tires are periodically measured and the measurements are transmitted to the vehicle-installed device, and any abnormal air pressure is checked and recorded in the vehicle-installed device, the driver or operator can obtain a warning by taking out an abnormal state signal at a timing that is required by the driver or operator.

By transmitting an abnormal air pressure signal from the vehicle-installed device to the portable device by operation (touching, pressing, or lifting) of any of the door touch switches of the vehicle, it is possible to inform the driver that an abnormality has occurred immediately before he gets into the vehicle, so that a period of efficient transmission to the portable device can be ensured.

What is claimed is:

1. A tire air pressure abnormality warning device comprising:
    a transmitter for transmitting a signal that corresponds to air pressure of a tire measured by a pressure sensor;
    a portable keyless entry device for opening and closing a door lock of a vehicle; and
    a vehicle-installed device for determining whether or not the air pressure of the tire is abnormal by receiving the signal from the transmitter in order to output data regarding the determination, the vehicle-installed device driving the door lock by communication with the portable device;
    wherein the vehicle-installed device comprises a recording section for recording data of any abnormality in the air pressure of the tire,
    wherein the portable device comprises a warning indicating section for indicating that the air pressure of the tire is abnormal,
    wherein the vehicle-installed device searches for any abnormality data from the recording section when the vehicle-installed device communicates with the portable device, so that, when there is abnormality data, a tire air pressure abnormality signal is transmitted to the portable device, and
    wherein the portable device indicates a warning of an abnormal air pressure of the tire by the tire air pressure abnormality signal that the portable device has received.

2. A tire air pressure abnormality warning device according to claim 1, wherein the communication between the vehicle-installed device and the portable device is a passive keyless entry communication using a request signal from the vehicle-installed device to the portable device and an answer signal from the portable device to the vehicle-installed device, and wherein the tire air pressure abnormality signal is transmitted along with the request signal.

3. A tire air pressure abnormality warning device according to claim 2, wherein a door of the vehicle comprises a door touch switch, and wherein the request signal and the tire air pressure abnormality signal are transmitted by operating the door touch switch.

4. A tire air pressure abnormality warning device according to claim 1, wherein the transmitter periodically measures the air pressure of the tire and transmits a measured value to the vehicle-installed device, and wherein, when the vehicle-installed device determines that the air pressure of the tire is abnormal, the vehicle-installed device records abnormality data in the recording section, with a driver receiving the data from the recording section when the driver gets into or out of the vehicle.

5. A method for performing a tire air pressure abnormality warning operation using a transmitter for transmitting a signal that corresponds to air pressure of a tire measured by a pressure sensor, a portable keyless entry device for opening and closing a door lock of a vehicle, and a vehicle-installed device for determining whether or not the air pressure of the tire is abnormal by receiving the signal from the transmitter in order to output data regarding the determination, the vehicle-installed device driving the door lock by communication with the portable device, the method comprising the steps of:
- by the vehicle-installed device, determining that the signal transmitted from the transmitter indicates an abnormality in the air pressure of the tire and recording abnormality data in a recording section;
- during communication of the vehicle-installed device with the portable device, by the vehicle-installed device, searching for any abnormality data from the recording section and, if there is any abnormality data, transmitting a tire air pressure abnormality signal to the portable device; and
- by the portable device, indicating a warning of abnormal air pressure of the tire by the tire air pressure abnormality signal using a warning indicating section.

6. A tire air pressure abnormality warning device comprising:
- a transmitter for transmitting a signal that corresponds to air pressure of a tire measured by a pressure sensor;
- a portable keyless entry device for opening and closing a door lock of a vehicle; and
- a vehicle-installed device for determining whether or not the air pressure of the tire is abnormal by receiving the signal from the transmitter in order to output data regarding the determination, the vehicle-installed device driving the door lock by communication with the portable device;
- wherein the portable device comprises a warning indicating section for indicating a warning of an abnormal air pressure of the tire by the tire air pressure abnormality signal that the portable device has received, and
- wherein the communication between the vehicle-installed device and the portable device is a passive keyless entry communication using a request signal from the vehicle-installed device to the portable device and an answer signal from the portable device to the vehicle-installed device, and wherein the tire air pressure abnormality signal is transmitted along with the request signal.

7. A tire air pressure abnormality warning device comprising:
- a transmitter for transmitting a signal that corresponds to air pressure of a tire measured by a pressure sensor;
- a portable keyless entry device for opening and closing a door lock of a vehicle; and
- a vehicle-installed device for determining whether or not the air pressure of the tire is abnormal by receiving the signal from the transmitter in order to output data regarding the determination, the vehicle-installed device driving the door lock by communication with the portable device;
- wherein the portable device comprises a warning indicating section for indicating a warning of an abnormal air pressure of the tire by the tire air pressure abnormality, the portable device receiving the abnormality signal from the vehicle-installed device before the door lock is driven.

* * * * *